May 23, 1939.  J. C. WELCH ET AL  2,159,346
BOLTED CONNECTION
Filed Jan. 19, 1937
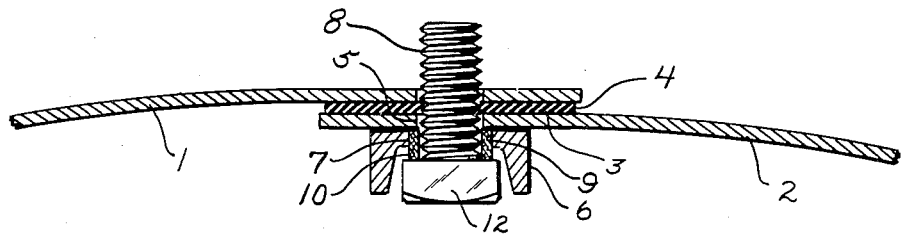
Fig.1.
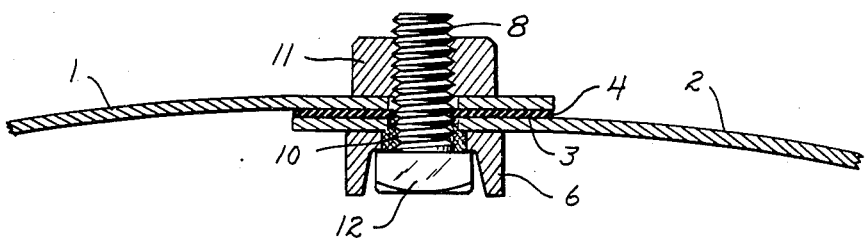
Fig.2.
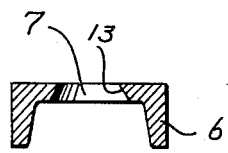   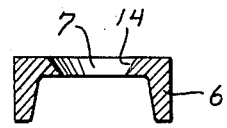
Fig.3.   Fig.4.
Inventors
J. C. WELCH
M. P. WILDER
By Jesse R. Stone
&
Lester B. Clark
Attorneys Patented May 23, 1939

2,159,346

UNITED STATES PATENT OFFICE 2,159,346

BOLTED CONNECTION

Joseph C. Welch and Marshall P. Wilder, Houston, Tex.

Application January 19, 1937, Serial No. 121,243

2 Claims. (Cl. 220—81)

The invention relates to a leak-proof bolt and nut assembly of utility in composite structures adapted to hold liquids, such structures, for example, as tanks for storing oil, water and other liquids.

Large fluid containers are frequently made up of metal sheets, the edges of which are overlapped and are formed into a composite structure by the use of bolts at spaced points through the overlap. In some instances the thickness of the metal sheets is insufficient to withstand the pull exerted when the container is used for its intended purpose. In such cases the bolts are also made to pass through a re-enforcing member overlying the overlap of adjacent sheets. In either event leakage frequently occurs in the bolted connection, as is apparent from leakage stains to be seen, for example, in installations of large storage tanks for oil. While the invention is primarily of interest in the construction of large storage tanks, it is to be understood that the invention is not confined thereto but comprehends utility in any bolted composite structure where a leak-proof seal between the bolt and jointed members is desirable or necessary.

It is an object of the invention to provide a leak-proof bolt and nut assembly wherein a leak-proof seal about the bolt is provided.

A more specific object is to provide a bolt and nut assembly in which a recess is provided between the bolt and the adjacent structural member and packing material is deformed within the recess about the bolt when the nut is tightened to form the rigid structure with a fluid tight seal between the bolt and the surrounding structural member.

Another object is to provide a bolt and nut assembly of overlapping plates re-enforced by a channel member overlying the overlap, an annular recess being provided about the bolt passing through the channel member and packing being deformed in said recess to effect a fluid seal between the bolt, channel and overlying plates.

Another object of the invention is to provide a bolt and nut construction wherein a seal is obtained around the bolt where it is first contacted by the liquid so as to prevent seepage of the liquid along the bolt.

Still another object of the invention is to flow a packing about the threads of a bolt so as to provide a seal.

Other objects, together with the foregoing, will be apparent from the following description taken in connection with the drawing, in which:

Fig. 1 illustrates a sectional view of the assembly of parts preliminary to the application of a nut to unite the parts into a composite unit.

Fig. 2 is similar to Fig. 1 but shows the complete assembly in which the advantages of the invention are realized.

Fig. 3 shows a modification of the invention in which a tapered opening is provided in the re-enforcing member.

Fig. 4 illustrates another embodiment in which the opening in the channel member is shown as tapered outwardly through the web.

1 and 2 are metal sheets to be used as elements in the forming of a composite liquid container embodying the invention. These plates are overlapped at 3 with an interposed gasket 4, an opening 5 passing through the assembly thus formed. In order to strengthen the structure to be formed a re-enforcing channel plate 6 overlies the overlapped portion 3 and is provided with an opening 7 in mating relation with the opening 5 in plates 1 and 2. Opening 7 is larger than is necessary to receive bolt 8 and hence forms an annular recess 9 about bolt 8, which recess receives an elongated washer 10 of deformable material. The difference in size of the openings 5 and 7 exposes a corner or shoulder 15 on the inside face of the inner plate 2 against which the washer 10 will abut as seen in Fig. 1.

In Fig. 2 nut 11 has been tightened upon bolt 8 and washer 10 has been caused to flow under pressure to internally contact head 12 and the threads of bolt 8 and hence to form sealing engagement with these surfaces while at the same time the material of washer 10 has also flowed around the shoulder 15 and into sealing engagement with the wall of the opening 5 of re-enforcing channel 6 and the adjacent surfaces of plate 2. With this construction it is apparent that liquid cannot flow along the underside of head 12 and the peripheral surface of bolt 8 nor can liquid flow along the walls of the opening in either channel 6 or plate 2. Likewise fluid cannot pass through the overlap 3 of plates 1 and 2 because of gasket 4 in the overlap. It is also obvious that the packing has flowed into the threads of the bolt 8 to form a seal therewith.

Effective spreading of the material of washer under pressure applied by the tightening of nut 11 is essential for the successful practice of the invention. Fig. 3 shows a modification designed to more effectively spread the material of washer 10. In this modification the opening 7 is provided with converging walls 13. This construction tends to direct the flow of the material of washer 10 along the body of the bolt in the opening in plate 2 and at the same time to enhance the flow along the inner side of head 12 of the bolt.

In the embodiment illustrated in Fig. 4, channel member 6 is provided with an opening 7 having diverging walls 15 which tend to constrict the flow through the washer 10 against the small area on the underside of head 12 of the bolt and to effect sealing engagement over a relatively large area about it in the opening 5 in plate 2. This embodiment is particularly effective in preventing seepage of liquid between the contact surfaces of the channel 6 and plate 2.

While plates 1 and 2 are shown as curved to illustrate use of the invention in connection with the construction of a circular container, this feature is not essential as the invention is amenable to use in any construction where a fluid tight bolted joint is desired.

What is claimed is:

1. A bolted connection for tanks comprising two overlapping plates, a sealing sheet between the plates, a reenforcing channel member inside of the overlap, said channel comprising a web and inwardly facing flanges, a bolt passed outwardly through all of the assembled parts with the head of the bolt disposed in the channel so that the flanges hold the bolt against rotation, a resilient non-metallic packing ring around said bolt and in the opening of the channel, said ring being normally of a greater depth than the thickness of the chanel web, the opening in the channel to receive said ring being larger than the remaining openings so that the inside plate provides a shoulder at the base of the channel opening upon which said ring is seated, and a nut to thread onto said bolt to pull the head outwardly against the web of the channel and to apply pressure to said ring so as to deform the ring by pressing it against the inside of the opening in the channel, against the periphery of the bolt, and against the shoulder of the inside plate and outwardly along the bolt to contact said sealing sheet so as to completely seal the inside of the bolted connection and said sealing sheet to prevent seepage along the bolt.

2. A bolted tank connection including a channel on the inside, overlapping tank plates, a gasket between said plates, bolt receiving openings through said channel, plates and gasket, the opening through said channel being of larger diameter than the openings in said plates, a packing ring of non-metallic material disposed in the channel opening, a bolt having its head non-rotatably disposed in said channel, and a nut to be applied to the end of said bolt to draw the bolt head tightly against the channel and to deform said packing ring to force it to fill the larger channel opening and engage the periphery of the bolt and to be forced along the bolt through the inner of said plates to abut and have a sealing engagement with said gasket to form a continuous unbroken seal between the plates and around the bolt.

JOSEPH C. WELCH.
MARSHALL P. WILDER.